(12) United States Patent
Gallucci et al.

(10) Patent No.: US 10,087,556 B2
(45) Date of Patent: Oct. 2, 2018

(54) REDUCED DENSITY ARTICLE

(71) Applicant: SABIC Global Technologies B.V., Bergen op Zoom (NL)

(72) Inventors: Robert R. Gallucci, Mt. Vernon, IN (US); Vandita Pai-Paranjape, Evansville, IN (US); Thomas Hocker, Pittsfield, MA (US); Keith E. Cox, Newburgh, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 190 days.

(21) Appl. No.: 15/036,562

(22) PCT Filed: Nov. 7, 2014

(86) PCT No.: PCT/US2014/064558
§ 371 (c)(1),
(2) Date: May 13, 2016

(87) PCT Pub. No.: WO2015/077053
PCT Pub. Date: May 28, 2015

(65) Prior Publication Data
US 2016/0298268 A1 Oct. 13, 2016

Related U.S. Application Data

(60) Provisional application No. 61/907,107, filed on Nov. 21, 2013.

(51) Int. Cl.
| | | |
|---|---|---|
| *C08K 5/526* | (2006.01) | |
| *D01F 6/64* | (2006.01) | |
| *C08K 5/523* | (2006.01) | |
| *B33Y 10/00* | (2015.01) | |
| *B33Y 70/00* | (2015.01) | |
| *B33Y 80/00* | (2015.01) | |
| *C09D 169/00* | (2006.01) | |
| *D01F 1/10* | (2006.01) | |
| *B29C 64/106* | (2017.01) | |
| *B29K 69/00* | (2006.01) | |

(52) U.S. Cl.
CPC .............. *D01F 6/64* (2013.01); *B29C 64/106* (2017.08); *B33Y 10/00* (2014.12); *B33Y 70/00* (2014.12); *B33Y 80/00* (2014.12); *C08K 5/523* (2013.01); *C08K 5/526* (2013.01); *C09D 169/00* (2013.01); *D01F 1/10* (2013.01); *B29K 2069/00* (2013.01); *D10B 2401/041* (2013.01)

(58) Field of Classification Search
CPC ..... D10B 2401/10; C08L 69/00; C08K 5/523; C08K 5/526; B29C 67/20; D01F 6/64
See application file for complete search history.

(56) References Cited

U.S. PATENT DOCUMENTS

| | | |
|---|---|---|
| 3,153,008 A | 10/1964 | Fox |
| 3,334,154 A | 8/1967 | Kim |
| 4,001,184 A | 1/1977 | Scott |
| 4,123,436 A | 10/1978 | Holub et al. |
| 4,131,575 A | 12/1978 | Adelmann et al. |
| 4,636,544 A | 1/1987 | Hepp |
| 5,034,458 A | 7/1991 | Serini et al. |
| 5,387,639 A | 2/1995 | Sybert et al. |
| 5,521,230 A | 5/1996 | Bhatia et al. |
| 5,672,645 A | 9/1997 | Eckel et al. |
| 5,863,974 A | 1/1999 | Tjahjadi et al. |
| 5,866,058 A | 2/1999 | Batchelder et al. |
| 5,968,561 A | 10/1999 | Batchelder et al. |
| 6,255,371 B1 | 7/2001 | Schlosser et al. |
| 6,605,657 B1 | 8/2003 | Favis et al. |
| 6,605,659 B2 | 8/2003 | Blackburn et al. |
| 6,609,043 B1 | 8/2003 | Zoia et al. |
| 7,452,944 B2 | 11/2008 | Gallucci et al. |
| 7,652,107 B2 | 1/2010 | Gallucci et al. |
| 7,790,292 B2 | 9/2010 | Colborn et al. |
| 7,812,077 B2 | 10/2010 | Borade et al. |
| 7,932,310 B2 | 4/2011 | Gallucci et al. |
| 8,017,699 B1 | 9/2011 | Sanner et al. |
| 8,236,227 B2 | 8/2012 | Batchelder et al. |
| 8,263,691 B2 | 9/2012 | Gallucci et al. |
| 8,292,610 B2 | 10/2012 | Hehl |
| 8,309,637 B2 | 11/2012 | Sanner et al. |

(Continued)

FOREIGN PATENT DOCUMENTS

WO 2015134316 A1 9/2015

OTHER PUBLICATIONS

China Office Action for Chinese Patent Application No. 2014800639935; OA Transmission dated Mar. 3, 2017; 3 pages; Non-English Translation.
China Office Action for Chinese Patent Application No. 2014800639935; OA Transmission dated Mar. 3, 2017; 7 pages; English Translation.
"Aircraft Materials Fire Test Handbook" DOT/FAA/AR-00/12, Chapter 5 "Heat Release Test for Cabin Materials"; 2000; 20 pages.
International Preliminary Report for International Application No. PCT/US2015/017967; International Filing Date Feb. 27, 2015; dated Sep. 15, 2016; 6 pages.
International Search Report for International Application No. PCT/US2015/017967; International Filing Date Feb. 27, 2015; dated May 13, 2015; 4 pages.

(Continued)

*Primary Examiner* — Peter D. Mulcahy
(74) *Attorney, Agent, or Firm* — Cantor Colburn LLP

(57) ABSTRACT

A reduced density article of manufacture, and process for making same, made from a thermoplastic polycarbonate composition. The reduced density article of manufacture has (1) a certain density and (2) a certain micro structure containing from 1% to 20% by volume of voids wherein at least 80% of the voids are high aspect voids and less than 20% of the voids are spherical voids with a diameter of 10 to 100 microns. The polycarbonate thermoplastic composition comprises at least 50 mole % of a certain bisphenol A. The reduced density article of manufacture is made by a monofilament additive manufacturing technique.

20 Claims, 3 Drawing Sheets

(56) References Cited

U.S. PATENT DOCUMENTS

| | | | |
|---|---|---|---|
| 8,349,933 | B2 | 1/2013 | Bhandari et al. |
| 9,011,982 | B2 | 4/2015 | Muller et al. |
| 9,283,714 | B2 | 3/2016 | Pridoehl et al. |
| 2,999,835 | A1 | 9/2016 | Goldberg |
| 2002/0137827 | A1 | 9/2002 | Tomioka et al. |
| 2007/0036964 | A1 | 2/2007 | Rosenberger et al. |
| 2007/0179657 | A1 | 8/2007 | Holzwarth |
| 2007/0290410 | A1 | 12/2007 | Koo et al. |
| 2009/0062436 | A1* | 3/2009 | Breiner ............ C08K 5/523 524/117 |
| 2012/0251750 | A1 | 10/2012 | Sybert et al. |
| 2012/0252961 | A1 | 10/2012 | Sybert et al. |
| 2013/0071599 | A1 | 3/2013 | Kraibuhler et al. |
| 2013/0224461 | A1 | 8/2013 | Van Der Mee et al. |
| 2013/0261202 | A1 | 10/2013 | Cao et al. |
| 2013/0284991 | A1 | 10/2013 | Sybert et al. |

OTHER PUBLICATIONS

Written Opinion for International Application No. PCT/US2015/017967; International Filing Date Feb. 27, 2015; dated May 13, 2015; 5 pages.

Comb et al.; "Layered Manufacturing Control Parameters and Material Selection Criteria"; Manufacturing Science and Engineering, vol. 2; 1994; pp. 547-556.

El-Gizawy et al.; "An integrated approach for characterization of properties and mesostructure of fused deposition modeling ULTEM 9085 products"; Database Compendex, Database Accession No. E20104813443888 Abstract; 2010; 1 page.

International Search Report for International Application No. PCT/US2014/064558; International Filing Date Nov. 7, 2014; dated Apr. 21, 2015; 6 pages.

Masood et al.; "Tensile Properties of Processed FDM Polycarbonate Material"; Materials Science Forum, vols. 654-656; 2010; pp. 2556-2559.

Novakova-Marcincinova et al.; "Special Materials Used in FDM Rapid Prototyping Technology Application"; IEEE 16th International Conference Intelligent Engineering Systems; 2012; 73-76.

Rodriguez et al.; "Characterization of the mesostructure of fused-deposition acrylonitrile-butadiene-styrene materials"; Rapid Prototyping Journal, vol. 6, No. 3; 2000; pp. 175-185.

Wohlers; "Making Products By Using Addictive Manufacturing", 2011; pp. 70-77; Retrieved from http://www.sme.org/uploadedFiles/Publications/ME_Magazine/2011/April_2011/April%202011%20f1%20Additive.pdf.

Written Opinion for International Application No. PCT/US2014/064558; International Filing Date Nov. 7, 2014; dated Apr. 21, 2015; 7 pages.

Ziemian et al.; "Anisotropic Mechanical Properties of ABS Parts Fabricated by Fused Deposition Modelling"; Mechanical Engineering, Dr. Murat Gokcek (Ed.); 2012; pp. 159-181.

International Preliminary Report on Patentability for International Application No. PCT/US2014/064558; International Filing Date Nov. 7, 2014; dated May 24, 2016, 7 pages.

El-Gizawy A S; Cardona J; Graybill B: International SAMPE Symposium and Exhibition (Proceedings)—SAMPE 2010 Conference and Exhibition "New Materials and Processes for a New Economy" 2010 Soc. For the Advancement of Material and Process Engineering USA, May 17, 2010-May 20, 2010.

* cited by examiner

US 10,087,556 B2

REDUCED DENSITY ARTICLE

CROSS REFERENCE TO RELATED APPLICATIONS

This application is a National Stage application of PCT/US2014/064558, filed Nov. 7, 2014, which claims the benefit of U.S. Provisional Application No. 61/907,107, filed Nov. 21, 2013, both of which are incorporated by reference in their entirety herein.

BACKGROUND

Additive Manufacturing (AM) is a new production technology that is transforming the way all sorts of things are made. AM makes three-dimensional (3D) solid objects of virtually any shape from a digital model. Generally, this is achieved by creating a digital blueprint of a desired solid object with computer-aided design (CAD) modeling software and then slicing that virtual blueprint into very small digital cross-sections. These cross-sections are formed or deposited in a sequential layering process in an AM machine to create the 3D object. AM has many advantages, including dramatically reducing the time from design to prototyping to commercial product. Running design changes are possible. Multiple parts can be built in a single assembly. No tooling is required. Minimal energy is needed to make these 3D solid objects. It also decreases the amount waste and raw materials. AM also facilitates production of extremely complex geometrical parts. AM also reduces the parts inventory for a business since parts can be quickly made on-demand and on-site. However, AM has the disadvantages of slow cycle time and that that the cost of the materials used for each build are considerably higher than conventional injection molding operations. Thus, there is a need to lower the cost of those AM materials without sacrificing the process benefits and flexibility of the AM process.

BRIEF DESCRIPTION

One embodiment can be a reduced density article of manufacture comprising a polycarbonate thermoplastic composition, the reduced density article of manufacture having (1) a density of 80% to 99% by weight of a similar solid standard injection molded article having no voids and (2) a micro structure containing from 1% to 20% by volume of voids wherein at least 80% of the voids are high aspect voids and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight; and wherein the reduced density article of manufacture is made by a monofilament additive manufacturing technique.

Another embodiment can be a reduced density article of manufacture comprising a mixture of thermoplastic polycarbonate composition and at least 50 ppm of a triaryl phosphate having a weight average molecular weight (Mw) of at least 300, the reduced density article of manufacture having (1) a density of 80% to 95% by weight of a similar solid standard injection molded article having no voids; (2) having a micro structure containing from 1% to 20% by volume of voids wherein at least 80% of the voids are high aspect voids have an aspect ratio from 2:1 to 100:1 with a major length of less than 5 mm and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight, a tensile strength at yield of greater than 5,000 psi, and a flex modulus at 100° C. greater than 1,000 psi (as measured on 3.2 mm bars by dynamic mechanical analysis (DMA) as per ASTM D4065-01); and wherein the reduced density article of manufacture is made by a monofilament additive manufacturing technique using a monofilament having a diameter from 0.01 to 5.0 mm.

Another embodiment can be a reduced density article of manufacture comprising a mixture of a thermoplastic polycarbonate composition and at least 50 ppm of a triaryl phosphate having a weight average molecular weight (Mw) of at least 300, the reduced density article of manufacture having (1) a density of 80% to 95% by weight of a similar solid standard injection molded article having no voids; (2) having a micro structure containing from 1% to 20% by volume of voids wherein at least 80% of the voids are high aspect voids have an aspect ratio from 2:1 to 100:1 with a major length of less than 5 mm and less than 20% of the voids are spherical voids with a diameter of 10 to 100 microns; wherein the polycarbonate thermoplastic material comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight, a tensile strength at yield of greater than 5,000 psi, and a flex modulus at 100° C. greater than 1,000 psi (as measured on 3.2 mm bars by dynamic mechanical analysis (DMA) as per ASTM D4065-01); wherein the reduced density article of manufacture is made by a monofilament additive manufacturing technique using a monofilament having a diameter from 0.01 to 5.0 mm; and wherein the reduced density article of manufacture has a grooved surface with vertical deviation of at least 0.01 mm with a groove depth from 20 to 100 micro meters (μm) and groove spacing of from 0.05 to 2.0 mm.

Still another embodiment can be a process for making a reduced density article of manufacture comprising (1) depositing a multitude of thermoplastic monofilaments using a fused deposition modeling apparatus in a crossing pattern and (2) fusing the multitude of strands together to make a reduced density article of manufacture having voids therein; wherein the a reduced density article of manufacture comprising a thermoplastic polycarbonate composition, the reduced density article of manufacture having (1) a density of 80% to 99% by weight of a similar standard injection molded article having no voids and (2) a micro structure containing from 1% to 20% by volume of voids wherein at least 80% of the voids are high aspect voids and less than 20% of the voids are spherical voids with a diameter of 10 to 100 microns; wherein the polycarbonate thermoplastic material comprises at least 50 mole % bisphenol A with a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight; and wherein the reduced density article of manufacture is made by an monofilament additive manufacturing technique.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
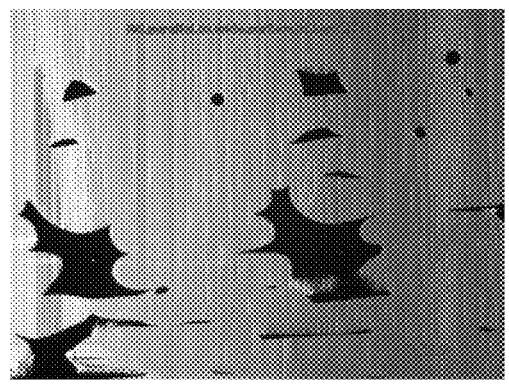
FIG. 1 is a photograph of a cut of a first reduced density thermoplastic polycarbonate monofilament manufactured 3.2 mm flex bar made on a fused deposition modeling (FDM) apparatus wherein the cut is parallel to wide surface of the monofilament. This shows the interior cross-section of the part.
Figure 2:
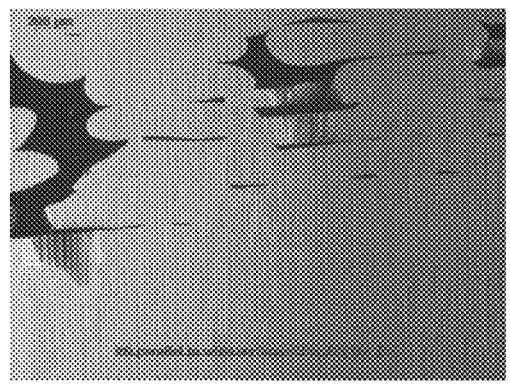
FIG. 2 is a photograph of a second cut of a second reduced density thermoplastic polycarbonate monofilament manufactured 3.2 mm flex bar made on a fused deposition modeling (FDM) apparatus wherein the cut is parallel to wide surface of the monofilament This second view also shows the angular voids with acute cusp angles.
Figure 3:
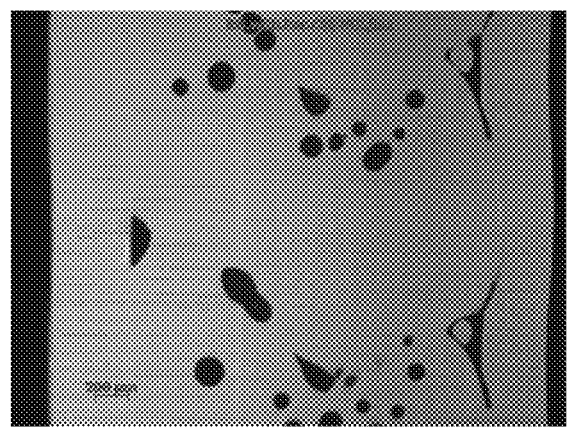
FIG. 3 is a photograph of a cut of a third reduced density thermoplastic polycarbonate monofilament manufactured 3.2 mm flex bar made on a fused deposition modeling (FDM) apparatus wherein the cut is cross the long axis of the monofilament (i.e., the monofilament is cut in two pieces and then one of the cut ends is photographed).

These reduced density articles have the advantage of having lower material costs per build while maintaining the structural integrity of that build. This is the result of the unusual voided areas in the micro-structure of those articles coupled with the physical properties of the specific thermoplastic polycarbonate compositions used to make that build. Also, the design flexibility and facile changes to part geometry of the monofilament AM process are still retained. The transparency of the polycarbonate is not retained, and while mechanical properties are reduced to some extent vs. an injection molded part, the lower density article still has useful properties.

The term "reduced density" as used in the present specification and claims means that the article of manufacture will have a density that is less than similar shaped article of manufacture having no voids made by a standard injection molding process of that same material. In addition, reduced density articles herein have a high percentage of high aspect voids and a low percentage of spherical voids therein.

The term "monofilament additive manufacturing technique" as used in the present specification and claims means that the article of manufacture can be made by any additive manufacturing technique that makes a three-dimensional solid object of any shape by laying down material in layers from a plastic monofilament from a digital model. For example, the monofilament can be made by laying down a plastic filament that is unwound from a coil or is deposited from an extrusion head. These monofilament additive manufacturing techniques include fused deposition modeling (FDM) and fused filament fabrication (FFF).

The term "aspect ratio" as used on this specification and claims means the ratio of longest or major length of the void to the shortest or minor length of the void.

The term "high aspect voids" as used in the present specification and claims means that the means the aspect ratio of the void is greater than 2:1. One optional type of high aspect voids can be angular voids having a cusp angle that is an acute angle of 60 degrees or less. These angular voids can be optionally present in amounts at least 20% of the voids.

The term "spherical voids" as used in the present specification and claims means that the aspect ratio of the void is less than 1.5:1.

The terms "Fused Deposition Modeling (FDM)" or "Fused Filament Fabrication (FFF)" involves building a part or article layer-by-layer by heating thermoplastic material to a semi-liquid state and extruding it according to computer-controlled paths. FDM utilizes a modeling material and a support material. The modeling material comprises the finished piece, and the support material comprises scaffolding that can be mechanically removed, washed away or dissolved when the process is complete. The process involves depositing material to complete each layer before the base moves down the Z-axis and the next layer begins.

The term "polycarbonate" as used herein means a polymer or copolymer having repeating structural carbonate units of formula (1)

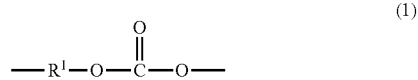

(1)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3):

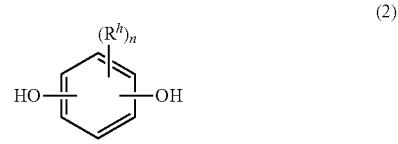

(2)

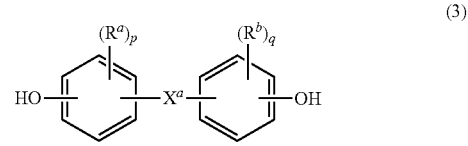

(3)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl; and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

These aromatic polycarbonates can be manufactured by known processes, such as, for example, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid or hydroxy acid in the event a carbonate copolymer or interpolymer rather than a homopolymer is desired for use in the preparation of the polycarbonate mixtures. Polyarylates and polyester-carbonate resins or their blends can also be employed. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

In any event, the preferred aromatic carbonate for use in the practice in the present invention is a homopolymer, e.g., a homopolymer derived from 2,2-bis(4-hydroxyphenyl)propane (bisphenol-A) and a carbonate or carbonate precursor, commercially available under the trade designation LEXAN Registered TM from SABIC.

Specific dihydroxy compounds include resorcinol, 2,2-bis (4-hydroxyphenyl) propane ("bisphenol A" or "BPA", in which in which each of $A^1$ and $A^2$ is p-phenylene and Xa is isopropylidene in formula (3)), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane (DMBPC), and from bisphenol A and 1,1-bis (4-hydroxy-3-methylphenyl)-3,3,5-trimethylcyclohexane (isophorone bisphenol). Silicone polycarbonate copolymer compositions and their blends are of special note due to their high impact strength and are resistant to the long exposure to oxidation during the long AM part build.

The thermoplastic polycarbonate compositions used herein possess a certain combination of chemical and physical properties. They are made from at least 50 mole % bisphenol A having a weight-average molecular weight (Mw) of 10,000 to 50,000 and have a glass transition temperature (Tg) from 130 to 180 degrees C., a phenolic OH end group content of less than 50 ppm, a halide group content below 100 ppm, and a diaryl carbonate content below 1% by weight. In other instances, the polycarbonate resin will have a carbamate group content of less than 10 ppm.

Besides this combination of physical properties, these thermoplastic polycarbonate compositions may also possess certain optional physical properties. these other physical properties include having a carbamate group content of less than 10 ppm; a tensile strength at yield of greater than 5,000 psi, and a flex modulus at 100° C. greater than 1,000 psi (as measured on 3.2 mm bars by dynamic mechanical analysis (DMA) as per ASTM D4065-01).

Besides using one or more thermoplastic polycarbonate compositions as the monofilament, the monofilament may also be made from blends of thermoplastic polycarbonates with other thermoplastic materials. Such materials can include acrylonitrile butadiene styrene (ABS), acrylic rubber, ethylene-vinyl acetate (EVA), ethylene vinyl alcohol (EVOH), fluoroplastics, ionomers, liquid crystal polymer (LCP), methacrylate styrene butadiene (MBS), polyacetal (POM or acetal), polyacrylates (acrylic), polyacrylonitrile (PAN or acrylonitrile), polyamide (PA or nylon), polyamide-imide (PAI), polyaryletherketone (PAEK or ketone), polybutadiene (PBD), polybutylene (PB), polybutylene terephthalate (PBT), polycaprolactone (PCL), polytetrafluoroethylene (PTFE), polyethylene terephthalate (PET), polycyclohexylene dimethylene terephthalate (PCT), polyhydroxyalkanoates (PHAs), polyketone (PK), polyesters, polyester carbonates, polyethylene (PE), polyetheretherketone (PEEK), polyetherketoneketone (PEKK), polyetherimide (PEI), polyethersulfone (PES), polysulfone, polyimide (PI), polylactic acid (PLA), polymethylpentene (PMP), polyolefins, polyphenylene oxide (PPO), polyphenylene sulfide (PPS), polyphthalamide (PPA), polypropylene (PP), polystyrene (PS), polysulfone (PSU), polyphenylsulfone, polytrimethylene terephthalate (PTT), polyurethane (PU), styrene-acrylonitrile (SAN), silicone polycarbonate copolymers, or any combination thereof. Polycarbonate blends with ABS, SAN, PBT, PET, PCT, PEI, PTFE, or combinations thereof are of particular note to the balance of the desirable properties such as melt flow, impact and chemical resistance. The amount of these other thermoplastic materials can be from 0.1% to 70 wt. %, in other instances, from 1.0% to 50 wt. %, and in yet other instances, from 5% to 30 wt %, based on the weight of the monofilament.

Besides the thermoplastic polycarbonate compositions and other thermoplastic materials, these monofilament manufactured articles may also optionally contain at least 50 ppm of a triaryl phosphate having a weight average molecular weight (Mw) of at least 300. Alternatively, the monofilament may optional contain at least 100 ppm of a mixture of triaryl phosphate and triaryl phosphite each having a weight average molecular weight (Mw) of at least 300, wherein the wherein the triaryl phosphate is present in a greater amount than the triaryl phosphite. In some instances, the triaryl phosphates may help improve melt flow. Combinations of triaryl phosphates with triaryl phosphites may improve thermal aging, for example, with respect to color retention or impact properties, especially in blends with unsaturated rubbers. Examples of triaryl phosphates include, but are not limited to, tris di-t-butyl phenyl phosphate, triphenyl phosphate, tris isodecyl phenyl phosphate, tris nonyl phenyl phosphate, cresyl phosphates, phenyl cresyl phosphates, xylyl phosphates and mixtures thereof. In other instances, the monofilament or monofilament manufactured article will also comprise a triaryl phosphite, including, but are not limited to, tris di-t-butyl phenyl phosphite, triphenyl phosphite, tris isodecyl phenyl phosphite, tris nonyl phenyl phosphite, cresyl phosphites, phenyl cresyl phosphites, xylyl phosphites and mixtures thereof. In many instances, both the triaryl phosphate and the triaryl phosphite will be present in the polycarbonate monofilament and manufactured article. In other instances, the phosphate will be present in higher concentrations than the phosphite. In yet other instances, the total phosphate and phosphite concentration will be less than 1 wt. %. In other instances, the total concentration of phosphorous containing species will be less than 0.5 wt. %.

Other ingredients can also be added to the monofilaments. These include colorants such as solvent violet 36, pigment blue 60, pigment blue 15:1, pigment blue 15.4, carbon black, titanium dioxide or any combination thereof.

In one embodiment, reduced density articles of our invention have more than 0 and less than 5 weight % of a member selected from the group consisting of polyvinyl chloride (PVC), polyvinylidene chloride, polyacetal, cellulosics; cellulose acetate, cellulose butyrate, cellulose propionate, polychloroprene, melamine formaldehyde, urea formaldehyde, polyacrylamide, and combinations thereof. In another embodiment, reduced density articles of our invention have less than 5 weight % polyvinyl chloride (PVC), polyvinylidene chloride, polyacetal, cellulosics; cellulose acetate, cellulose butyrate, cellulose propionate, polychloroprene, melamine formaldehyde, urea formaldehyde, polyacrylamide, and combinations thereof. In another embodiment, reduced density articles of our invention do not have any detectable amounts of polyvinyl chloride (PVC), polyvinylidene chloride, polyacetal, cellulosics; cellulose acetate, cellulose butyrate, cellulose propionate, polychloroprene, melamine formaldehyde, urea formaldehyde, polyacrylamide, and combinations thereof.

The monofilament manufactured articles can be formed by (1) depositing a multitude of thermoplastic monofilaments using a fused deposition modeling apparatus in a layer or crossing pattern and (2) fusing the multitude of strands together to make a reduced density article of manufacture having voids therein. Often the article will have from 10 to 10,000 monofilament layers of varying orientation and placement, making a wide variety of shapes of varying dimensions and thicknesses. In some instances, the shape will be hollow with a wall thickness from 1 to 30 mm. In those instances, the voids described herein will be found in the walls of the article. The monofilaments can have a diameter from 0.01 to 5.0 mm. The monofilament can be made by any known technique, for example, melt extrusion through a forming die of polymer pellets or granules.

In some instances, the forming of the article from the heating of the monofilament can be carried out in an inert atmosphere containing less than 1 volume % oxygen. The inert atmosphere may be chosen from nitrogen, carbon dioxide, argon, krypton. xenon and mixtures thereof. Use of a non-oxidizing atmosphere can protect the monofilament manufactured article from oxidative degradation. Degradation can manifest itself in many ways, for instance a change in color. In other instances degradation results in a loss of impact. This is especially true in blends with rubber for example unsaturated butadiene based rubbery polymers such as MBS and ABS. A non-oxidizing atmosphere can also help to prevent the degradation of stabilizers in the MMP article so that there is still some stabilizer remaining after forming in order to protect the article in its final use. Examples of stabilizers that would otherwise be consumed in an oxidizing monofilament forming process include; hindered phenols, thioesters, phosphites and combinations thereof. The long forming time needed to form additive manufactured articles places the resin at high temperature, near or above the glass transition (Tg) temperature for greater than 2 hours and in some instances greater than 4 hours. This long exposure to air can cause problems with degradation and stabilizer depletion. This can be avoided with an inert atmosphere. In addition monofilament formulations with much higher than normal stabilization (for example 0.3 to 1.5 wt. % antioxidants) may be needed in some instances.

As opposed to higher pressure forming process such as injection molding, blow molding and sheet extrusion, the as made monofilament manufactured article will have a high surface roughness with vertical deviation of at least 0.01 mm. For example, the reduced density article of manufacture can have a grooved surface as measured by ISO 4287 with vertical deviation of at least 0.01 mm with a groove depth from 20 to 100 micro meters (μm) and groove spacing of from 0.05 to 2.0 mm. The term "grooved surface" as used herein includes fluted, corrugated, ridged and other uneven surfaces. The rough surface has very regular appearance that may be useful or attractive in some applications. In situations where a smoother surface is desired the initially formed rough grooved surface may be removed in subsequent operations such as sanding, peening, shot blasting, laser peening and the like. However such operations add extra steps and complexity to the manufacturing operation.

In one embodiment, our invention includes a method for building a three-dimensional reduced density articles in an extrusion-based digital manufacturing system, the method comprising: providing a consumable filament of the polymeric material such as the a thermoplastic polycarbonate composition of our invention to the extrusion-based digital manufacturing system, the consumable filament having a length, an exterior surface, and a plurality of tracks along at least a portion of the length, wherein the plurality of tracks provide a fractal dimensionality for at least a portion of the exterior surface that is greater than two for a suitable length scale, e.g., a length scale between 0.01 millimeters and 1.0 millimeter; engaging teeth of a rotatable drive mechanism retained by the extrusion-based digital manufacturing system with the plurality of tracks of the consumable filament; feeding successive portions of the consumable filament with the rotatable drive mechanism to a liquefier retained by the extrusion-based digital manufacturing system, wherein successive teeth of the rotatable drive mechanism are continuously engaged with successive tracks of the plurality of tracks while feeding the successive portions of the consumable filament; melting the consumable filament in the liquefier to provide a melted consumable material; extruding the melted consumable material from the liquefier; and depositing the extruded consumable material in a layer-by-layer manner to form at least a portion of the reduced density article, which can generate back pressure in the liquefier. The consumable filament can be made by any suitable geometry. In one embodiment, the consumable filament has a substantially cylindrical geometry with an average diameter ranging from about 1.1 millimeters to about 2.6 millimeters. In another embodiment, the consumable filament has a substantially rectangular cross-sectional profile. The plurality of tracks can be selected from the group consisting of rectangular tracks, parabolic tracks, worm-type tracks, corrugated tracks, textured tracks, impressed file-type tracks, herringbone-type tracks, sprocket tracks, edge-facing tracks, staggered tracks, and combinations thereof.

As such, our invention includes an embodiment in which the reduced density article is made in an extrusion-based digital manufacturing system, the method comprising: providing a consumable filament of a polymeric material, e.g., a thermoplastic polycarbonate composition, to the extrusion-based digital manufacturing system, the consumable filament having a length, an exterior surface, and a plurality of tracks along at least a portion of the length, wherein the plurality of tracks provide a fractal dimensionality for at least a portion of the exterior surface that is greater than two for a length scale between 0.01 millimeters and 1.0 millimeter; engaging teeth of a rotatable drive mechanism retained by the extrusion-based digital manufacturing system with the plurality of tracks of the consumable filament; feeding successive portions of the consumable filament with the rotatable drive mechanism to a liquefier retained by the extrusion-based digital manufacturing system, wherein successive teeth of the rotatable drive mechanism are continuously engaged with successive tracks of the plurality of tracks while feeding the successive portions of the consumable filament; melting the consumable filament in the liquefier to provide a melted consumable material; extruding the melted consumable material from the liquefier; and depositing the extruded consumable material in a layer-by-layer manner to form at least a portion of the reduced density article. A suitable apparatus for carrying out this method is disclosed in U.S. Pat. No. 8,236,227, the entire disclosure of which is herein incorporated by reference.

In another embodiment, the invention relates to a method for producing a three-dimensional object such as the reduced density article of this invention in direct construction sequence by additive construction from a solidifiable material, such as polycarbonate composition of our invention, which is either present in the starting state in a fluid phase or can be liquefied. The direct construction sequence multiple material components are discharged alternately in a programmable manner by means of multiple discharge units and, already joined to one another as a result of the discharge, configure different parts of the object, such that the geometric proportions obtained during discharge already correspond to the object, and where the material components between each other form either edge regions merging into one another without boundaries or boundary regions of the different material components abutting one another without joining. In such a method, the additive construction can occur from layer to layer. The solidifiable material can be discharged in the form of drops as the smallest discharge quantity. The drops can be joined together in a positive-locking manner in one embodiment. In another embodiment, a different material component is placed next to one another drop by drop. The drops can be joined together in a positive-locking manner. In an embodiment, there is discharged in the edge region or boundary region a material component forming an intermediate layer and configured as a separable connection between the materials adjoining the intermediate layer. A predetermined spacing or a clearance between the parts of the object adjoining the intermediate layer can be set by means of the intermediate layer. Such methods for making reduced density articles can be modified variants of the method disclosed in US20130071599, incorporated herein in its entirety. A suitable device for carrying out such methods for making reduced density articles can be found in U.S. Pat. No. 8,292,610, incorporated herein in its entirety.

Although the foregoing description has been focused on reduced density articles made from polycarbonate compositions, the scope of our invention also includes embodiments that comprise a reduced density article of manufacture comprising a component chosen from (i) a polyetherimide component selected from the group consisting of polyetherimide homopolymers, polyetherimide co-polymers, polyetherether ketones homopolymers, polyetherether ketones copolymers, polyphenylene sulfones homopolymers, polyphenylene sulfones copolymers, (ii) a polymeric component selected from the group consisting of poly (phenylene ether) component, a poly(phenylene ether)-polysiloxane block copolymer and their polystyrene blends, and (iii) acrylonitrile-butadiene-styrene (ABS) graft copolymers, and combinations thereof, the reduced density article of manufacture having (1) a density of 80% to 99% by weight of a similar standard injection molded article having no voids and (2) a micro structure containing from 1% to 20% by volume of voids wherein at least 80% of the voids are high aspect voids and less than 20% of the voids are spherical voids with a diameter of 10 to 100 microns, such that the reduced density article of manufacture is made by a monofilament additive manufacturing technique.

In another embodiment, our invention includes a process for making a reduced density article of manufacture comprising (1) depositing a multitude of thermoplastic monofilament strands having a diameter from 0.1 to 20.0 mm using a fused deposition modeling apparatus in a crossing pattern and (2) fusing the multitude of strands together to make a reduced density article of manufacture having voids therein; wherein the a reduced density article of manufacture comprises a composition, the reduced density article of manufacture having (a) a density of 80% to 99% by weight of a similar standard injection molded article having no voids and (b) a micro structure containing from 1% to 20% by volume of voids wherein at least 80% of the voids are high aspect voids and less than 20% of the voids are spherical voids with a diameter of 10 to 100 microns; such that the composition comprises (i) a polyetherimide component selected from the group consisting of polyetherimide homopolymers, polyetherimide co-polymers, polyetherether ketones homopolymers, polyetherether ketones copolymers, polyphenylene sulfones homopolymers, polyphenylene sulfones copolymers, (ii) a polymeric component selected from the group consisting of poly(phenylene ether) component, a poly(phenylene ether)-polysiloxane block copolymer and their polystyrene blends, and (iii) acrylonitrile-butadiene-styrene (ABS) graft copolymers, and combinations thereof.

EXAMPLES

The following examples illustrate the present invention, but are not meant to be limitations to the scope thereof. Numbers designate examples of the invention; comparative examples are designed by letters.

ASTM test parts were made using a Stratasys Fortus System 400 MC machine (for example as described in U.S. Pat. Nos. 5,968,561 and 5,866,058) using a round polycarbonate monofilament of 1.75 mm diameter. The bisphenol A polycarbonate (PC) had a weight average molecular weight (Mw) of 22,000 with 0.03 wt. % tris di-tert butyl phenyl phosphite, 0.15 wt. % pentaerythritol tetra stearate (PETS) processing aid and 2 ppm of solvent violet 36 and 1 ppm of pigment blue 60 colorants. This polycarbonate was made using a standard interfacial process. It had a p-cumyl phenol end cap. The phase transfer catalyst was triethylamine, the solvent was methylene chloride. pH was controlled by addition of sodium hydroxide. The polymer solution was washed with acid and water and isolated by steam precipitation. The PC powder was blended with phosphite stabilizer, polyester mold release and colorant and pelletized on a twin screw vacuum vented extruder. The resin was not dried prior to extrusion. In a separate operation the pellets were used to extrude the monofilament used in the additive manufacturing process (MMP) described herein. The 3.2 mm thick monofilament manufactured (MMP) bars were built up on a platform using an alternating 45 degree crossing pattern for each layer. Twelve layers were deposited over a period of 2 hours at 320 to 365° C. melt temperature and a 145° C. oven temperature to form parts. Ten monofilament manufactured parts were made at the same time. The parts were very hazy with a % transmission (% T) below 20%. The MMP parts further had a very rough, uneven surface showing a repeating pattern of striations with a depth of from 20 to 100 μm and spacing of from 0.05 to 2.0 mm.

The injection molded control parts were made using polycarbonate pellet of weight average molecular weight (Mw) of 22,000 with 0.03 wt. % tris di-tert butyl phenyl phosphite (Mw=649.9), 0.15 wt. % pentaerythritol tetra stearate (PETS) and 2 ppm of solvent violet 36 and 1 ppm of pigment blue 60 colorants. The pellets were dried for 4 hr. at 110° C. and molded at 300° C. on 60T van Dorn molding machine. Total cycle time was about 30 sec. screw speed ~100 rpm, back pressure ~50 psi with a 2000 psi inject pressure. The mold temperature was about 75° C. As opposed to the MMP parts, the injection molded parts were clear and glossy with a smooth surface showing no striations. The percent transmission (% T) of the injection molded part at 3.2 mm as measured by ASTM method D1003-92, was >85%, surface gloss was over 100.

Tensile properties were measured on monofilament manufactured and injection molded parts using ASTM method D638-10 on 190.5×3.2 mm dog-bone samples at a crosshead speed of 50 mm/min. Tensile modulus was measured as tangent, tensile strength (peak load) is reported at yield. Flexural modulus and strength were measured on 127×6.4 mm bars as per ASTM method D790-00. Part weight was determined to two decimal places using a Mettler analytical balance. All parts were equilibrated for at least 2 days at 23° C. and 50% relative humidity prior to testing. Density was measured as per ASTM D792-00

The voids in the MMP sample parts were evaluated by cutting the parts and examining the cross-sections using optical microscopy. The parts were initially cut with saw and then polished with a diamond knife at a 45 degree angle using a Leica Ultracut UCT machine. As shown in FIGS. 1 to 5 the relative size of the voids will vary depending on the angle in which the part is cut and the manner in which the monofilament were laid down to make the part. However all parts made by monofilament additive manufacturing have some portion of large (>10 micron) voids that will be of an angular nature, that is non-spherical (having a length/diameter >1.5), with angular cusps. In some instances the cusp angle was an acute angle of less than 60 degrees.

Polycarbonate molecular weights [weight average (Mw) and number average (Mn)] were determined using gel permeation chromatography (GPC) as per ASTM method D5296-97. Polycarbonate standards were used for calibration, methylene chloride was used as the solvent.

Tri aryl phosphate and triaryl phosphate content was determined by high temperature gas chromatography of an extract of the parts dissolved in methylene chloride. Diaryl carbonate (in this instance dicumyl carbonate) and residual bisphenol A were determined in a similar manner. This method is performed in order to determine additives and other residues in polymers by means of high temperature gas chromatography (HT-GC). The procedure is based upon dissolution of the resin in methylene chloride followed by precipitation of the higher molecular weight portions of the resin using methanol solvent which was selected such that the additives of interest remain in solution. The extracts are then quantified by on-column injection on a HT-GC equipped with an analytical column capable of 400° C. The instrument is calibrated by analyzing solutions of additives at known concentrations. This method can also be used to qualitatively compare additive samples for impurities or to compare polymer samples for both known and unknown compounds. Polycarbonate resin samples in pellet or part form are acceptable for this test. The preferred sample amount is approximately 5 grams. Scope of test: the additives analyzed using this method includes tris di tert butyl phenyl phosphite, molecular weight=649.9 Daltons (for example IRGAFOS 168 from BASF Co.) tris di tert butyl phenyl phosphate (molecular weight=662.9 Daltons). Di-p-cumyl carbonate (DPCPC), pentaerythritol tetra stearate (PETS). Other additives or by products may also be quantified.

Phenolic end groups of the polymer were measured by $P^{31}$ NMR spectroscopy, using phosphorous functionalization of the phenolic polycarbonate end groups, to characterize the resins. A sample was dissolved in $CDCl_3$ (deutero chloroform) with pyridine and chromium (III) AcAc (acetylacetonate); trichloro phenol was used as a standard. The active phosphorylating agent, which derivatized the phenolic functionality into phosphorous containing species, was o-phenylene phosphorochloridite (CAS #1641-40-3). The resin solutions were allowed to react for at least 15 minutes, converted into their phosphorus derivatives and analyzed by phosphorous NMR (nuclear magnetic resonance). Phosphorus 31 isotope signals were observed and quantified vs. the trichloro phenol standard. The chemical shift for the PC phenolic end group derivative was 125.4 ppm.

Table 1 shows the relative weights of standard injection molded polycarbonate (PC) parts vs. the monofilament consolidated parts of manufactured PC process. The monofilament manufactured parts (MMP) tested were 127×3.2 mm flex bars and 190.5×3.2 mm type 1 tensile bars made at melt temp. 365° C. and oven temp. 145° C. Injection molded bars of about the same dimension as the MMP parts were molded at ~300 degrees C. on 60T van Dorn molding machine using a 75° C. mold temperature and a 30 sec. cycle time. The monofilament manufactured parts were opaque with a rough surface. The injection molded parts were clear and glossy with a smooth surface showing no striations. The % T of the injection molded parts (at 3.2 mm as measured by ASTM D1003-92) was >85% surface gloss was over 100. The MMP parts had a % T below 20 at 3.2 mm.

TABLE 1

Part Density

| Example | | Part Weight | % Wt. Reduction |
|---|---|---|---|
| A | Injection molded PC part | 6.08 g | n/a |
| 1 | Monofilament Manufactured PC part | 5.80 g | 4.6% |

The monofilament manufactured process (MMP) part show lower weight/density due to a series of unusually shaped voids (FIGS. 1 to 5). The voids in the sample parts were evaluated by cutting the parts and examining the cross-sections using optical microscopy. The exact relative size of the voids will vary to some extent depending on the angle at which the part is cut. However all parts made by monofilament manufacturing have some portion of large (>10 micron) voids that are of an angular nature, that is non-spherical having a length to diameter greater than 1.5. Many of the voids have angular cusps as observed in FIGS. 1, 2, 3, 4 and 5. In some instances more than 20% of the voids had acute cusp angles that were less than 60 degrees.

Mechanical properties of the opaque monofilament manufactured parts were reduced compared to the solid injection molded parts (Table 2). Tensile properties (3.2 mm part), especially strength at peak load (tensile strength at yield) are reduced due to the non-spherical voids; however tensile modulus is still over 38 MPa (~5510 psi) and tensile yield is still over 100 kilogram force (kgf). Flexural properties showed a similar trend with flexural modulus (~6.4 mm thick part) still above 40 MPa (~5800 Kpsi) and peak flexural peak load above 8 kgf in the monofilament manufactured article.

TABLE 2

Part Mechanical Properties

| Example | | Tensile Mod. MPa | Peak Tensile Load (kgf) | Flex Mod. MPa | Peak Flexural Load(kgf) |
|---|---|---|---|---|---|
| A | Injection molded PC part | 40.7 | 269.3 | 49.1 | 10.1 |
| 1 | Monofilament Manufactured PC part | 39.3 | 107.5 | 42.5 | 8.6 |

The molecular weight of the polycarbonate parts made by the monofilament manufacturing process (Table 3), which is an indicator of mechanical and rheological properties, is retained to a surprising extent with both Mw and Mn having over 95% retention of the monofilament Mw despite the long time at 145° C. A temperature close to the PC glass transition (Tg) of 149° C. Tg was measured as per ASTM method D7028-07 using a 20° C./min. heating rate. Mw and Mn were measured by gel permeation chromatography (GPC) in methylene chloride solution using polycarbonate calibration standards.

TABLE 3

Polycarbonate Molecular Weight

| Molecular weight | Example C PC Monofilament | Example 1 PC MMP Mfg'd Part | % Retention |
|---|---|---|---|
| PC Mw | 22040 | 21731 | 98.6% Mw retention |
| PC Mn | 9770 | 9444 | 96.7% Mn retention |

Despite the retention of molecular weight the monofilament manufactured PC article shows a sharp increase in triaryl phosphate content (Table 4) going from only 66 ppm in the pellet to 274 ppm in the monofilament to 424 ppm in the monofilament manufactured part. This is an unusual situation wherein the newly manufactured article has a higher amount of triaryl phosphate than triaryl phosphite, in this instance there is a surprising lack of any detectable triaryl phosphite in the MMP article. Dicumyl carbonate was less than 1000 ppm and BPA was below 20 ppm. Phenolic OH end groups (determined by NMR spectroscopy) were less than 100 ppm. Proton (H) NMR and chemical analysis showed the resin to have less than 10 ppm diethyl carbamate end groups.

TABLE 4

Polycarbonate Additive Composition

| Chemical Analyses | Example B PC Pellets | Example C PC Monofilament | Example 1 PC MMP Mfg'd Part |
|---|---|---|---|
| Triaryl Phosphite ppm | 280 | 162 | 0 |
| Triaryl Phosphate ppm | 66 | 274 | 424 |

Triaryl phosphite is tris (2,6-di-tertbutyl phenyl) phosphite
Triaryl phosphate is tris (2,6-di-tertbutyl phenyl) phosphate The monofilament manufactured article has a low gloss granular surface with a highly regular pattern of striations. Using a surface profilometer technique as described in ISO method 4287 the surface on an injection molded control was compared to monofilament manufactured parts (MMP). Surface roughness was determined in micro meters (μm) as: Ra, average amplitude of roughness, Rz, highest peak to valley length, Rp, highest peak and Rv, shallowest valley. Control example A, the injection molded part shows a very flat surface (Table 5), Ra less than 0.5 μm with Rz, Rp and Rv less than 0.5 μm. The MMP parts show a more textured surface with Ra from 5 to 15 Rz of 30 to 80 μm, Rp from 15 to 30 μm and Rv of about 20 to 45 μm. Note that the base surface (starting monofilament layer) and the top surface (final monofilament layer) of the monofilament manufactured parts show a difference in the surface roughness making an asymmetrical structure. In some instances the top surface will be 20 to 50% as rough as the base, that is: Ra base ≥0.2 to 0.5×Ra top. The injection molded parts are symmetric with no differences in the surfaces.

Figure 4:
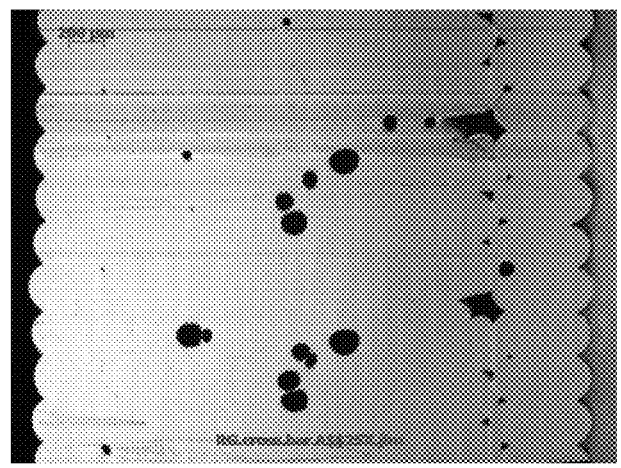
FIG. 4 is a photograph of a cut of a fourth reduced density thermoplastic polycarbonate monofilament manufactured a fused deposition modeling (FDM) apparatus wherein the cut is cross the long axis of the monofilament (i.e., the monofilament is cut in two pieces and then one of the cut ends is photographed).
Figure 5:
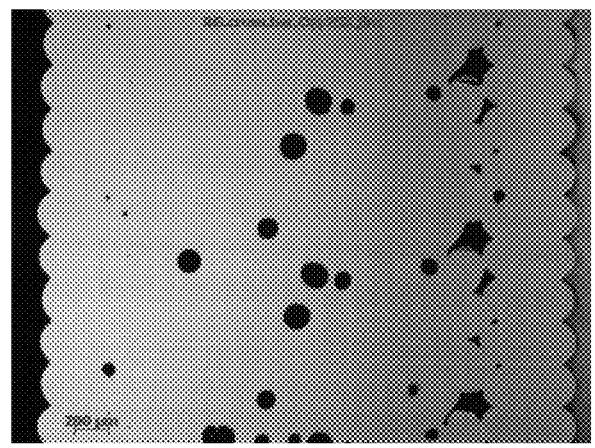
FIG. 5 is a photograph of a cut of a fifth reduced density thermoplastic polycarbonate monofilament manufactured a fused deposition modeling (FDM) apparatus wherein the cut is cross the long axis of the monofilament (i.e., the monofilament is cut in two pieces and then one of the cut ends is photographed). This second view also shows the angular voids with acute cusp angles.

FIGS. 4 and 5 show a cross-section of the striated surface of the MMP (monofilament manufactured) 3.2 mm thick flex bar.

TABLE 5

Surface Roughness of Polycarbonate Parts

| Example | Description | Surface Measured | Ra (μm) | Rz (μm) | Rp (μm) | Rv (μm) |
|---|---|---|---|---|---|---|
| A | Injection Molded PC Control | Side-1 | 0.043 | 0.30 | 0.17 | 0.13 |
|   |   | Side-2 | 0.019 | 0.24 | 0.12 | 0.13 |
| 1 | PC Flex bar - MMP | Top side | 9.0 | 62.2 | 28.1 | 34.0 |
|   |   | Base | 8.2 | 39.4 | 14.9 | 24.5 |
| 2 | PC Tensile Bar - MMP | Top side | 10.8 | 73.2 | 29.6 | 43.6 |
|   |   | Base | 5.5 | 43.8 | 22.7 | 21.1 |

Surface roughness measured as per ISO 4287-1997
Ra Average Roughness of Arithmetic Roughness - indicates amplitudes of surface smoothness
Rz Total Roughness - indicates peak-to-valley height within the evaluation length
Rp Roughness Peak - indicates height of tallest peak within the evaluation length
Rv Roughness Valley - indicates depth of shallowest valley within the evaluation length.
(Note: Rz = Rp + Rv)

Measurements were performed on the 3.2 mm thick polycarbonate parts using a Stylus Profilometer manufactured by Kosaka Laboratories (Japan); model 1700a, according to ISO 4287-1997, and ASME B46.1B—2009. Data filter used was Gaussian, filter cut-off was 0.8 mm, and the scan length was 23 mm for each reading. For the narrow samples, the scan length had to be reduced to 6.35 mm. ten readings were taken on each side of each sample; five readings in one arbitrary direction, the sample was then rotated 90 degrees and five more readings were taken. Reported values are averages of the ten readings.

Figure 6:
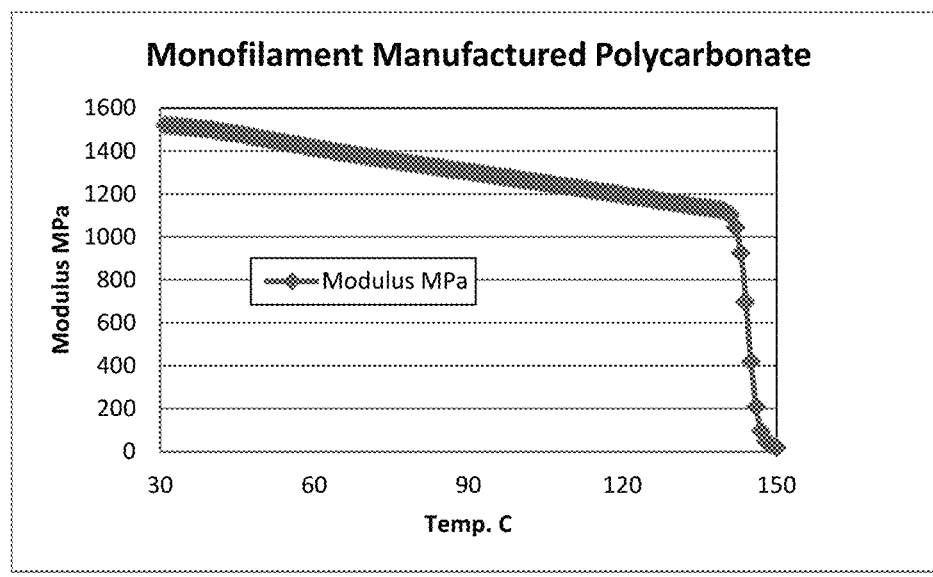
FIG. 6 is a graph of Tensile Modulus vs. Temperature of a monofilament manufactured polycarbonate (MMPC) part as measured by Dynamic Mechanical Analysis (DMA) on a 127×3.2 mm bar.

Modulus by DMA Monofilament Manufactured PC (MMPC) Part. The modulus vs. temperature was measured as per ASTM D4065-01 on 127×3.2 mm bars made via injection molding (Example A) and by deposition of a polycarbonate monofilament using a 45 degree alternate crossing pattern (Example 2). DMA (Dynamic Mechanical Analysis) was run in a flexural mode at 1 Hertz with a 3° C./min heating rate. As can be seen in Table 6 and FIG. 6 while the MMPC part has reduced mechanical properties due in part to the presence of voids, its modulus at 100° C. is still above 1000 MPa. Further, the modulus drops less than 200 MPa (less than 25%) in going from 50 to 100° C.

TABLE 6

Modulus vs Temperature

| | Modulus MPa | |
|---|---|---|
| Temp. ° C. | Example 2 MMPC part | Example A Injection Part |
| 40 | 1498 | 1944 |
| 50 | 1457 | 1903 |
| 60 | 1414 | 1839 |
| 70 | 1375 | 1760 |
| 80 | 1338 | 1678 |
| 90 | 1303 | 1615 |
| 100 | 1268 | 1579 |
| 110 | 1232 | 1569 |
| 120 | 1195 | 1587 |
| 130 | 1158 | 1615 |
| 140 | 1121 | 1244 |

The present invention includes following Embodiments:

Embodiment 1

A reduced density article of manufacture comprising a thermoplastic polycarbonate composition, the reduced density article of manufacture having (1) a density as measured by ASTM D792-00 of 80% to 99% by weight of a similar solid standard injection molded article having no voids and (2) a micro structure as measured by optical microscopy containing from 1% to 20% by volume of voids wherein at least 80% of the voids are high aspect voids and less than 20% of the voids are spherical voids with a diameter of 10 to 100 microns; wherein the polycarbonate thermoplastic material comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight; and wherein the reduced density article of manufacture is made by a monofilament additive manufacturing technique.

Embodiment 2

The reduced density article of manufacture of Embodiment 1 wherein the reduced density article of manufacture further comprises at least 50 ppm of a triaryl phosphate having a weight average molecular weight (Mw) of at least 300.

Embodiment 3

The reduced density article of manufacture of any of Embodiments 1-2 wherein the reduced density article of manufacture further comprises at least 100 ppm of a mixture of triaryl phosphate and triaryl phosphite each having a weight average molecular weight (Mw) of at least 300, wherein the wherein the triaryl phosphate is present in a greater amount than the triaryl phosphite.

Embodiment 4

The reduced density article of manufacture of any of Embodiments 1-4 wherein thermoplastic polycarbonate composition has a carbamate group content of less than 10 ppm.

Embodiment 5

The reduced density article of manufacture of any of Embodiments 1-4 wherein the article has high surface roughness with vertical deviation of at least 0.01 mm, or wherein the article has a grooved surface as measured by ISO 4287 (1997) with a groove depth from 20 to 100 micro meters (μm) and groove spacing of from 0.05 to 2.0 mm.

Embodiment 6

The reduced density article of manufacture of any of Embodiments 1-5 wherein the reduced density article of manufacture further comprises a thermoplastic material chosen from acrylonitrile butadiene styrene (ABS), acrylic rubber, methacrylate styrene butadiene (MBS), polyacrylates (acrylic), polybutylene terephthalate (PBT), polyethylene terephthalate (PET), polycyclohexylene dimethylene terephthalate (PCT), polyhydroxyalkanoates (PHAs), polyester carbonates, polyetherimide (PEI), polytrimethylene terephthalate (PTT), styrene-acrylonitrile (SAN), silicone polycarbonate copolymers, or any combination thereof and, optionally, wherein the article comprises less than 5 weight % of a member selected from the group consisting of (i) polyvinyl chloride (PVC), polyvinylidene chloride, polyacetal, cellulosics; cellulose acetate, cellulose butyrate, cellulose propionate, polychloroprene, melamine formaldehyde, urea formaldehyde, polyacrylamide, and combinations thereof.

Embodiment 7

The reduced density article of manufacture of any of Embodiments 1-6 wherein at least 90% of the voids are high aspect voids and less than 10% of the voids are spherical voids with a diameter of 10 to 100 microns.

Embodiment 8

The reduced density article of manufacture of any of Embodiments 1-7 wherein least 20% of the voids are angular voids having a cusp angle that is an acute angle of 60 degrees or less.

Embodiment 9

The reduced density article of manufacture of any of Embodiments 1-8 wherein the article has a tensile strength at yield of greater than 5,000 psi, and a flex modulus at 100° C. greater than 1,000 psi.

Embodiment 10

The article of any of Embodiments 1-9 wherein the reduced density article of manufacture further comprises a colorant chosen from solvent violet 36, pigment blue 60, pigment blue 15:1, pigment blue 15.4, carbon black, titanium dioxide or any combination thereof.

Embodiment 11

The article of any of Embodiments 1-10 wherein the high aspect voids have an aspect ratio from 2:1 to 100:1 with a major length of less than 5 mm.

Embodiment 12

A reduced density article of manufacture comprising a mixture of thermoplastic polycarbonate composition and at least 50 ppm of a triaryl phosphate having a weight average molecular weight (Mw) of at least 300, the reduced density article of manufacture having (1) a density as measured by ASTM D792-00 of 80% to 95% by weight of a similar standard injection molded article having no voids; (2) having a micro structure as measured by optical microscopy containing from 1% to 20% by volume of voids wherein at least 80% of the voids are high aspect voids have an aspect ratio from 2:1 to 100:1 with a major length of less than 5 mm and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight, a tensile strength at yield of greater than 5,000 psi, and a flex modulus at 100° C. greater than 1,000 psi; and wherein the reduced density article of manufacture is made by an monofilament additive manufacturing technique using a monofilament having a diameter from 0.01 to 5.0 mm.

Embodiment 13

The reduced density article of manufacture of Embodiment 12 wherein the material in the article contains at least 100 ppm of a mixture of triaryl phosphate and triaryl phosphite each having a weight average molecular weight (Mw) of at least 300, wherein the wherein the triaryl phosphate is present in a greater amount than the triaryl phosphite.

Embodiment 14

A process for making a reduced density article of manufacture comprising (1) depositing a multitude of thermoplastic monofilament strands having a diameter from 0.1 to 20.0 mm using a fused deposition modeling apparatus in a crossing pattern and (2) fusing the multitude of strands together to make a reduced density article of manufacture having voids therein; wherein the a reduced density article of manufacture comprises a thermoplastic polycarbonate composition, the reduced density article of manufacture having (a) a density as measured by ASTM D792-01 of 80% to 99% by weight of a similar standard injection molded article having no voids and (b) a micro structure as measured by optical microscopy containing from 1% to 20% by volume of voids wherein at least 80% of the voids are high aspect voids and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight.

Embodiment 15

The process for making a reduced density article of manufacture of Embodiments 14 wherein steps (1) and (2) are carried out in an inert atmosphere containing less than 1 volume % oxygen and wherein the inert atmosphere is chosen from nitrogen, carbon dioxide, argon, krypton, xenon and mixtures thereof.

Embodiment 16

The process for making a reduced density article of manufacture of any of Embodiments 14-15 wherein each monofilament comprises a thermoplastic polycarbonate composition strand with a diameter of 0.1 to 5 mm that is deposited by an extrusion head of a fused deposition modeling apparatus in an oven at a temperature from 280 to 380 degrees C. for average residence time from 30 to 300 minutes, wherein the thermoplastic polycarbonate composition has a change of weight average molecular weight (Mw) of less than 15% of the original molecular weight.

Embodiment 17

The process for making a reduced density article of manufacture of any of Embodiments 14-16 wherein reduced density article of manufacture further comprises at least 50 ppm of a mixture of triaryl phosphate and triaryl phosphite each having a weight average molecular weight (Mw) of at least 300, wherein the triaryl phosphate is present in a greater amount than the triaryl phosphite.

Embodiment 18

The process for making a reduced density article of manufacture of any of Embodiments 14-17 wherein the multitude of thermoplastic monofilaments are not dried before fusing.

Embodiment 19

The process for making a reduced density article of manufacture of any of Embodiments 14-18 wherein the majority of the major lengths of the high aspect voids are oriented in the direction of strand length.

Embodiment 20

A reduced density article of any of the Embodiments 1-13 comprising a tube, duct, hose, pipe, connector, conduit, enclosure for electrical equipment, parts of motors, compressors, exhaust manifolds, mufflers, parts of heating and air conditioning systems, kettles, carafes, bottles, jars, reservoirs, fuel or oil tanks, power distribution equipment, communication devices, personal grooming devices, toys and sculptures.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

The articles of the invention can include a wide array of devices, or portions of a device, for a variety of industries and end use applications: for example electrical, communication, transportation, medical, information management, material handling, manufacturing, food service, storage or industrial applications among others. Articles can also be for amusement such as toys and game pieces as well as artistic compositions such as sculptures, jewelry and fashion items.

Non limiting examples of articles can be tubes, ducts, hoses, pipes, connectors, conduits, enclosures for electrical equipment, parts of air handling systems, parts of motors, compressors, exhaust manifolds, mufflers, parts of heating and air conditioning systems, kettles, carafes, bottles, jars, reservoirs, fuel or oil tanks, power distribution equipment, communication devices and the like. Articles can also be for personal care and grooming.

Articles can further be hollow or essentially solid. Potential end uses include vehicles, for examples mass transit vehicles such as planes, buses and trains as well as individual vehicles such as automobiles, trucks, motorcycles, bicycles and the like. Complex, hollow three dimensional shaped articles are of special note including parts with undercuts. Ignition and flame resistant three dimensional article are also disclosed as are hollow versions thereof.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A reduced density article of manufacture comprising a thermoplastic polycarbonate composition, the reduced density article of manufacture having (1) a density as measured by ASTM D792-00 of 80% to 99% by weight of a similar solid standard injection molded article having no voids and (2) a micro structure measured by optical microscopy containing from 1% to 20% by volume of voids wherein at least 80% of the voids are high aspect voids and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight; and wherein the reduced density article of manufacture is made by a monofilament additive manufacturing technique.

2. The reduced density article of manufacture of claim 1 wherein the reduced density article of manufacture further comprises at least 50 ppm of a triaryl phosphate having a weight average molecular weight (Mw) of at least 300.

3. The reduced density article of manufacture of claim 1 wherein the reduced density article of manufacture further comprises at least 100 ppm of a mixture of triaryl phosphate and triaryl phosphite each having a weight average molecular weight (Mw) of at least 300, wherein the wherein the triaryl phosphate is present in a greater amount than the triaryl phosphite.

4. The reduced density article of manufacture of claim 1 wherein thermoplastic polycarbonate composition has a carbamate group content of less than 10 ppm.

5. The reduced density article of manufacture of claim 1 wherein the article has high surface roughness with vertical deviation of at least 0.01 mm, or wherein the article has a grooved surface as measured by ISO 4287 (1997) with a groove depth from 20 to 100 micro meters (μm) and groove spacing of from 0.05 to 2.0 mm.

6. The reduced density article of manufacture of claim 1 wherein the reduced density article of manufacture further comprises a thermoplastic material chosen from acrylonitrile butadiene styrene (ABS), acrylic rubber, methacrylate styrene butadiene (MB S), polyacrylates (acrylic), polybutylene terephthalate (PBT), polyethylene terephthalate (PET), polycyclohexylene dimethylene terephthalate (PCT), polyhydroxyalkanoates (PHAs), polyester carbonates, polyetherimide (PEI), polytrimethylene terephthalate (PTT), styrene-acrylonitrile (SAN), silicone polycarbonate copolymers, or any combination thereof and, optionally, wherein the article comprises less than 5 weight % of a member selected from the group consisting of (i) polyvinyl chloride (PVC), polyvinylidene chloride, polyacetal, cellulosics; cellulose acetate, cellulose butyrate, cellulose propionate, polychloroprene, melamine formaldehyde, urea formaldehyde, polyacrylamide, and combinations thereof.

7. The reduced density article of manufacture of claim 1 wherein at least 90% of the voids are high aspect voids and less than 10% of the voids are spherical voids with a diameter of 10 to 100 microns.

8. The reduced density article of manufacture of claim 1 wherein least 20% of the voids are angular voids having a cusp angle that is an acute angle of 60 degrees or less.

9. The reduced density article of manufacture of claim 1 wherein the article has a tensile strength at yield of greater than 5,000 psi, and a flex modulus at 100° C. greater than 1,000 psi.

10. The article of claim 1 wherein the reduced density article of manufacture further comprises a colorant chosen from solvent violet 36, pigment blue 60, pigment blue 15:1, pigment blue 15.4, carbon black, titanium dioxide or any combination thereof.

11. The article of claim 1 wherein the high aspect voids have an aspect ratio from 2:1 to 100:1 with a major length of less than 5 mm.

12. A reduced density article of manufacture comprising a mixture of thermoplastic polycarbonate composition and at least 50 ppm of a triaryl phosphate having a weight average molecular weight (Mw) of at least 300, the reduced density article of manufacture having (1) a density as measured by ASTM D792-00 of 80% to 95% by weight of a similar standard injection molded article having no voids; (2) having a micro structure as measured by optical microscopy containing from 1% to 20% by volume of voids wherein at least 80% of the voids are high aspect voids have an aspect ratio from 2:1 to 100:1 with a major length of less than 5 mm and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight, a tensile strength at yield of greater than 5,000 psi, and a flex modulus at 100° C. greater than 1,000 psi; and wherein the reduced density article of manufacture is made by an monofilament additive manufacturing technique using a monofilament having a diameter from 0.01 to 5.0 mm.

13. The reduced density article of manufacture of claim 12 wherein the material in the article contains at least 100 ppm of a mixture of triaryl phosphate and triaryl phosphite each having a weight average molecular weight (Mw) of at least 300, wherein the wherein the triaryl phosphate is present in a greater amount than the triaryl phosphite.

14. A process for making a reduced density article of manufacture comprising (1) depositing a multitude of thermoplastic monofilament strands having a diameter from 0.1 to 20.0 mm using a fused deposition modeling apparatus in a crossing pattern and (2) fusing the multitude of strands together to make a reduced density article of manufacture having voids therein; wherein the a reduced density article of manufacture comprises a thermoplastic polycarbonate composition, the reduced density article of manufacture having (a) a density as measured by ASTM D792-01 of 80% to 99% by weight of a similar standard injection molded article having no voids and (b) a micro structure as measured by optical microscopy containing from 1% to 20% by volume of voids wherein at least 80% of the voids are high aspect voids and less than 20% of the voids are spherical voids with a diameter of 10 to 100 microns; wherein the polycarbonate thermoplastic composition comprises at least 50 mole % bisphenol A having a weight-average molecular weight (Mw) of 10,000 to 50,000, a glass transition temperature (Tg) from 130 to 180 degrees C., a phenolic OH end group content of less than 50 ppm, a halide group content below 100 ppm, and a diaryl carbonate content below 1% by weight.

15. The process for making a reduced density article of manufacture of claim 14 wherein steps (1) and (2) are carried out in an inert atmosphere containing less than 1 volume % oxygen and wherein the inert atmosphere is chosen from nitrogen, carbon dioxide, argon, krypton, xenon and mixtures thereof.

16. The process for making a reduced density article of manufacture of claim 14 wherein each monofilament comprises a thermoplastic polycarbonate composition strand with a diameter of 0.1 to 5 mm that is deposited by an extrusion head of a fused deposition modeling apparatus in an oven at a temperature from 280 to 380 degrees C. for average residence time from 30 to 300 minutes, wherein the thermoplastic polycarbonate composition has a change of weight average molecular weight (Mw) of less than 15% of the original molecular weight.

17. The process for making a reduced density article of manufacture of claim 14 wherein reduced density article of manufacture further comprises at least 50 ppm of a mixture of triaryl phosphate and triaryl phosphite each having a weight average molecular weight (Mw) of at least 300, wherein the triaryl phosphate is present in a greater amount than the triaryl phosphite.

18. The process for making a reduced density article of manufacture of claim 14 wherein the multitude of thermoplastic monofilaments are not dried before fusing.

19. The process for making a reduced density article of manufacture of claim 14 wherein the majority of the major lengths of the high aspect voids are oriented in the direction of strand length.

20. A reduced density article of claim 1 comprising a tube, duct, hose, pipe, connector, conduit, enclosure for electrical equipment, parts of motors, compressors, exhaust manifolds, mufflers, parts of heating and air conditioning systems, kettles, carafes, bottles, jars, reservoirs, fuel or oil tanks, power distribution equipment, communication devices, personal grooming devices, toys and sculptures.

* * * * *